United States Patent
Schindler et al.

(10) Patent No.: US 9,573,565 B2
(45) Date of Patent: Feb. 21, 2017

(54) METHOD FOR DETECTING A FUNCTION ACTUATION ON VEHICLES

(71) Applicant: HUF HÜLSBECK & FÜRST GMBH & CO. KG, Velbert (DE)

(72) Inventors: Mirko Schindler, Velbert (DE); Peter Van Gastel, Solingen (DE); Bernd Gerdes, Essen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 14/900,029

(22) PCT Filed: Mar. 27, 2014

(86) PCT No.: PCT/EP2014/056227
§ 371 (c)(1),
(2) Date: Dec. 18, 2015

(87) PCT Pub. No.: WO2015/000608
PCT Pub. Date: Jan. 8, 2015

(65) Prior Publication Data
US 2016/0137165 A1     May 19, 2016

(30) Foreign Application Priority Data

Jul. 3, 2013 (DE) .................... 10 2013 106 968
Sep. 18, 2013 (DE) .................... 10 2013 110 296

(51) Int. Cl.
*B60R 25/20* (2013.01)
*B60R 25/24* (2013.01)
(Continued)

(52) U.S. Cl.
CPC ............ *B60R 25/245* (2013.01); *B60R 25/20* (2013.01); *B60R 25/2045* (2013.01);
(Continued)

(58) Field of Classification Search
CPC ...... B60R 25/245; B60R 25/20; B60R 25/246; B60R 25/2045; G07C 9/00309; G07C 2009/00404; G07C 2209/64; E05B 83/18; E05B 81/77; E05B 81/78; E05F 15/73; E05Y 2900/531; E05Y 2900/546
See application file for complete search history.

(56) References Cited

U.S. PATENT DOCUMENTS 8,091,280 B2    1/2012 Hanzel et al.
2004/0046449 A1*    3/2004 Eidesheim .............. E05B 81/78
                                                                    307/10.1
(Continued)

FOREIGN PATENT DOCUMENTS

DE    10 2004 041 709 B3    10/2005
DE    10 2006 037 237 A1    2/2008
(Continued)

OTHER PUBLICATIONS

International Search Report of International Application No. PCT/EP2014/056227 dated Jun. 5, 2014, 8 pages.
(Continued)

*Primary Examiner* — Michael J Zanelli
(74) *Attorney, Agent, or Firm* — Fay Sharpe LLP

(57) ABSTRACT

A method for detecting a function actuation on a motor vehicle with a sensor device includes monitoring the signals of a proximity sensor as to a first signal reply $S_1$. The signals of the proximity sensor are monitored for a time period $T_s$ wherein the method is interrupted when the signal reply changes by more than a value $S_t$ within the period of time $T_s$. The signal device is actuated after time $T_s$ has expired in order to signal to the user that the actuation of time has expired. The signals of the proximity sensor are monitored for time $T_e$ wherein the method is continued when the signal of the proximity sensor changes by more than a predetermined value $S_e$ within the period of time $T_e$. Otherwise, the method is interrupted. If the method is continued, the actuation of the function of the motor vehicle is detected and the function trigger is signaled to a control device in the motor vehicle.

16 Claims, 3 Drawing Sheets

(51) Int. Cl.
*E05B 81/78* (2014.01)
*E05F 15/73* (2015.01)
*E05B 83/18* (2014.01)
*G07C 9/00* (2006.01)

(52) U.S. Cl.
CPC ............ *B60R 25/246* (2013.01); *E05B 81/77* (2013.01); *E05B 81/78* (2013.01); *E05B 83/18* (2013.01); *E05F 15/73* (2015.01); *G07C 9/00309* (2013.01); *E05Y 2201/68* (2013.01); *E05Y 2400/86* (2013.01); *E05Y 2900/531* (2013.01); *E05Y 2900/546* (2013.01); *G07C 2009/00404* (2013.01); *G07C 2209/64* (2013.01)

(56) References Cited

U.S. PATENT DOCUMENTS

| | | | | |
|---|---|---|---|---|
| 2008/0147271 | A1* | 6/2008 | Breed | B60R 21/0132 701/36 |
| 2011/0242303 | A1* | 10/2011 | Giraud | E05B 81/78 348/77 |
| 2012/0290177 | A1* | 11/2012 | Wagenhuber | B60R 25/2045 701/49 |
| 2014/0136024 | A1* | 5/2014 | Herthan | B60R 25/2045 701/2 |
| 2015/0127193 | A1* | 5/2015 | Tofilescu | E05F 15/73 701/2 |

FOREIGN PATENT DOCUMENTS

| | | |
|---|---|---|
| DE | 10 2008 063 366 A1 | 7/2010 |
| DE | 10 2009 023 594 A1 | 12/2010 |
| DE | 10 2010 018164 A1 | 8/2011 |
| EP | 0 770 749 A2 | 5/1997 |
| EP | 1 733 937 A1 | 12/2006 |
| WO | WO 02/45030 A1 | 6/2002 |
| WO | WO 2011/026763 A1 | 3/2011 |
| WO | WO 2012/034768 A1 | 3/2012 |
| WO | WO 2012/108440 A1 | 8/2012 |

OTHER PUBLICATIONS

International Preliminary Report on Patentability of of International Application No. PCT/EP2014/056227 dated Jan. 5, 2016 and English translation thereof, 11 pages.

\* cited by examiner

METHOD FOR DETECTING A FUNCTION ACTUATION ON VEHICLES

BACKGROUND

The invention relates to a detection method for actuating a switching device on a motor vehicle. In particular, the invention relates to a method for detecting actuation gestures performed by a user for the purpose of accessing a vehicle function.

Devices for non-contact actuation of motor vehicle functions are known from prior art. For example, DE 10 2008 063 366 describes a trunk lid that can be actuated without direct contact. This device allows a user to perform an actuation gesture in the foot area below the rear bumper in order to actuate the trunk lid. For this purpose, this device comprises capacitance sensors which are arranged to detect within their detection range different space regions and which are able to detect an actuation gesture by means of their signals.

Such non-contact actuation of a trunk lid is conducive to comfort and safety when for various reasons it is difficult for a person to actuate the trunk lid manually.

The detection of a movement can include a body movement, for example, an apparent kick-motion, lifting and swiveling the leg or the like. However, it should be avoided that actuations are detected and a function is triggered when a respective actuation gesture is not specifically performed. For example, this can happen when objects (balls, pets or the like) get into the detection range.

DE 10 2004 041 709 discloses a device for a non-contact actuation of a trunk lid which proposes to use two sensor devices with separate detection ranges. For this purpose, it is possible to use as one of the sensor devices an ultrasound distance detection system, which has been provided on the motor vehicle for distance measurements.

U.S. Pat. No. 8,091,280 discloses a non-contact actuation device wherein a foot is optically detected in an optically marked area.

However, with regard to their actuation, the above-mentioned detection systems have disadvantages in different areas. If, because of physical restrictions or behavior constraints, it is not possible to perform a specific movement, such actuation systems are not suitable due to the required dynamics of motion.

It is the object of the invention to provide a detection and evaluation method for non-contact sensor devices which increases detection accuracy and which can be performed by the user in an easy and safe manner.

BRIEF SUMMARY

The invention-based method for detecting a function actuation on a vehicle makes use of a sensor device. The sensor device has at least one proximity sensor for detecting the approach of a user or one of his body parts. At the same time, the proximity sensor can comprise any type of proximity sensor, for example, an optical, capacitive or inductive sensor. The sensor is designed to output signals, wherein the signals are representative of an approach or a general change of the surroundings in the range of the sensor. For example, it is possible to output variable voltage values or digital values when the sensor is equipped with an appropriate converter circuit.

The proximity sensor is connected with electronic logic. If required these can also control and read further sensors of the sensor device in addition to the proximity sensor. The invention-based method is implemented in logic, for example, by using a respectively programmed microcontroller.

Subsequently, the steps of the invention-based method are described in more detail.

The signals of the proximity sensor are monitored continually or periodically with a predetermined scanning frequency (for example, 100 Hz) with regard to a signal change in the form of a characteristic first signal reply $S_1$. In the case of non-performance, i.e., in complete absence of a user, a signal reply on the level of an idle signal can be expected. Changed general ambient conditions (weather conditions, humidity, etc.) always comprise a slower change rate for several minutes or at least several seconds so that the level of the idle signal can be enabled in the control and evaluation logic. For example, this can be performed by means of floating notifications over the previous minutes, respectively.

However, an actuation produces a short-term, clear signal change. The entire quantity and the process of the signal change, here depicted as characteristic signal reply, depend on the type and installation of the respective sensor. For example, the signal change $S_1$ can be manifested in a significant signal increase or signal decrease. Here change rate and value depend on the speed and degree of approach by the user. A characteristic signal reply for a specific sensor type has been disclosed in prior art and can be determined by means of simple empirical testing. For example, capacitive sensors involve a significant change of capacitance of an electrode arrangement (for example, see WO2012/034768).

When such a signal reply $S_1$ is detected, i.e., the proximity sensor signals an approach, according to the invention the start of a timer is triggered, or a time measurement is started. As a result, the so-called fixed phase of the operating procedure is started. Starting with this moment of approach, the signal of the proximity sensor continues to be monitored within a period of time $t_s$ (t-fixed). If during this time period a significant signal change takes place, in particular one indicating a removal from the proximity sensor, the method is interrupted. If within the period of time $t_s$ the signal changes by more than a predetermined value $S_f$, it is indicated that the approach is cancelled, or not continued, and therefore no actuation is desired. At the same time, a certain tolerance has to be allowed because a user cannot remain completely motionless in his position.

Only when the approach is maintained, i.e., the hand, the finger, the arm, the hip or the foot remain in the approached position, the period of time has been successfully completed and the method shall be continued.

When this is the case, i.e., the approach continues for the period of time $t_s$, a signal device is activated.

This occurs in order to signal the user the process of the fixed actuation time. The signal device can be considered as a user-defined signal generator for human reception. In particular, it can involve a device that can be perceived optically or audibly. The user has to be able to perceive the signal device from his position in the operating area in which he is located. It is possible to use appropriate signaling devices available on the vehicle (stop lights, turn signals, reverse lights, audible devices, etc.) or signaling devices specifically designed and provided for this purpose. Through his fixed, continuous approach for the period of time $t_s$, the user has basically indicated his intention for actuation. However, it is important to reduce operating errors which can occur, for example, through unintentional approach, leaning against or touching the motor vehicle when cleaning or maintaining the vehicle, or the like.

Therefore, the user receives a feedback when successfully completing the fixed phase. This indicates the introduction of the dynamic phase of the operating procedure. The user is required to cancel the approach or move away from the proximity sensor. Alternatively, provision can be made to change the approach in a different predetermined manner. However, according to the invention, this change has to take place within a predetermined maximum period of time.

For this purpose, starting with the process of signaling the user, the signals of the proximity sensor are monitored during the dynamic phase for a period of time $t_e$. The method of detecting the actuation is only continued when the signal of the proximity sensor changes by more than a predetermined value $S_e$ within the period of time $t_e$.

The change of the signal has to indicate a significant change in the approach, for example, a removal or elimination of the approaching body part. The temporal restriction in connection with the process of signaling the user, faulty operation is largely excluded. Correspondingly, the time frame for removal is arranged for a few seconds. It is unlikely that an error detection takes place because for a successful actuation an approach and persistence for a fixed phase of the period of time $t_s$ is required, as well as a reaction to the signaling process within the reaction and removal phase $t_e$.

Instead of a reaction in the form of removing the body part, it is also possible to require a different signal change. For example, for the fixed phase it can be required to perform an approach as a reaction to the signaling process which has to be concluded with a further approach or contact within the period of the dynamic phase.

It is important that the operation is detected by means of at least two time specifications, namely a period of time $t_s$ during which the user has to leave his body part in a detection range and a period of time $t_e$ during which the body part, which has been changed in its position after the signaling process by the vehicle, has to be removed again.

When these requirements are successfully maintained, the method is continued and the actuation of the function on the motor vehicle is signaled to a control device of the vehicle.

The invention-based method makes it also possible for persons with physical restrictions to use the vehicle function. The operation is also possible for people who do not want to perform a specific actuation gesture because such a gesture is considered to be inappropriate in their cultural group. Appropriate periods of time $t_s$ and $t_e$ involve the second range, for example, a period of time $t_s$ of several seconds (for example, between 1 and 5 seconds) and a period of time $t_e$ also amounting to several seconds (for example, between 0.5 and 3 seconds) so as to provide the user with enough time for a reaction and to detect a clear intention for actuation.

According to the invention, the dynamics of detection of an actuation are slowed down. For this purpose, provision has been made that the actuation is detected when a user tracks a specific behavior in a predetermined time frame. In particular, this requires that a body part of the user stays in the detection range and is moved away from the detection range after the signaling process of the vehicle.

The invention-based method is resilient against error detection, for example, in situations in which the sensor is exposed to rain or drives through car-washing systems with moving parts. In addition, it is easy for the user to learn the actuation and can be comprehended by drivers of all ages.

In an advantageous embodiment of the invention, a request is sent to a portable ID transponder before a function is actuated. It is a wireless request asking for authorization to access the requested function.

Respective ID transponders are known from the field of keyless-go systems and communicate wirelessly in the high frequency range (HF) with the control system of the vehicle, wherein the ID transponder can be triggered also in the low frequency range. This communication with the ID transponder ensures that an actuation can be performed only by an authorized person located in a predetermined are in the vehicle. Through an antenna arrangement and antenna control, the request is restricted to a specific vehicle region, for example, the rear part, provided the actuation involves the trunk lid.

Advantageously, the request of the ID transponder can depend on the question of whether the fixed phase has been successfully completed. Then the ID transponder request is subordinate to the first sensor detection.

However, this dependence is not absolutely necessary. The call of the ID transponder can be made also prior to the sensor request, for example, in that the vehicle is repeatedly emitting requests to the ID transponder (polling system). In this case, the authorization is already available when the approach is detected by the first sensor.

For reasons of energy conservation and in order to avoid irritations, it is advantageous, but not absolutely necessary, to perform the request by the ID transponder before activating the signal device. As a result, the signaling process only takes place when authorization has been successful. Prior to the signaling process of the second phase, the ID transponder is tested so as to avoid an unnecessary signaling process, triggered by unauthorized persons.

In addition, it is advantageous when the invention-based method is performed and provided with parameters in such a way that during the first phase it is required that a user approaches the sensor device, but a minimal approach, for example, a contact results in an interruption of the method. This means that the user has to move a body part, for example, his hand, into the proximity of the sensor but the body part has to remain in close proximity, for example, between 1 cm and 15 cm before the sensor. A sensor can reliably detect such an approach, but at the same time, it is able to distinguish it from actually touching the sensor device. This embodiment has the advantage that undesirable actuations of the sensor device attached there for opening the trunk lid can be avoided when a vehicle owner is standing with his valid ID transponder behind the vehicle. If a physical contact would be detected as a valid actuation, rain running over the sensor or a polishing cloth could trigger the actuation of the trunk lid, even if this is not desired. However, because of the fact that this embodiment requires an approach without final contact such faulty operation is eliminated. This embodiment merely requires specific parameter setting or calibration of the sensor which measures the sensor signals for different degrees of approach and predetermines a valid signal range for the fixed phase, which precludes the contact of the sensor.

In a preferred embodiment of the method, capacitive sensor devices are used to form the approach sensor. In particular, the capacitive sensor devices have proven to be valuable for detecting approaches in the exterior area of a vehicle because they allow for reliable function and operate dependably in various weather and ambient conditions. In addition, in contrast to optical sensor devices, capacitive sensor devices provide signals that are easy to evaluate in the form of discreet charge values, capacitance and voltage values, which can be supplied to relatively simple and cost-effective evaluation logics.

However, for more complex embodiments, it is also possible to use an optical sensor device, for example, also in combination with a capacitive sensor device. It is also possible to use inductive sensor devices.

By means of already available optical sensor devices, which fulfill multiple purposes, it is also possible to detect especially the region behind the vehicle, for example, by means of rear view cameras, which can then assume the function of the second sensor device.

The invention-based method can be used for multiple operating devices on the vehicle, for example, on door handles, or on operating components in the interior space, such as the glove compartment, or on sliding doors or motorized swinging doors. If the operating devices already have signal devices (for example, lock illuminations, door handle lights or so-called apron lighting), these can be used for signaling the operating procedure to the user.

It is especially preferred when the invention-based method is used for opening a trunk lid of a vehicle. Because of the fact that the rear part of the vehicle is often used as storage space for additional load and manual operation of the trunk lid is often impractical because of the load carried by the user, the reduced dynamics of this actuation have great advantages when compared to customary actuation gestures. According to the invention, the actuation can be performed by means of a simple, reliable actuation with the hand, foot, hip or leg, the dynamics of which are reduced when compared to well-known methods. In the above-mentioned case it is practical to arrange the detection zone of the proximity sensor into an area behind the vehicle. There is a user who requires access to the rear storage space.

Preferably, in addition to signaling the sequence of the period of time $t_s$, i.e., the signal for removing the body part from the detection range, a signaling process is also performed for the upcoming opening of the trunk or the cover. This serves as a warning signal for the user, reminding him to move out of the swivel range of the trunk lid.

In the context of the invention, it is advantageous to provide the user with the signaling process as an operating aid in the form of an optical signal. Optical signals are less disturbing for the surrounding area than audible signals. For this purpose, it is possible to use a separate LED or a laser diode. However, it is especially advantageous to use available signals of the vehicle, for example, optical signals in the form of vehicle lamps (see above).

A sensor device for performing the invention-based method can be arranged at various places on the vehicle. For example, the sensor device can be integrated in handle strips or in lighting devices, especially in the rear part of the vehicle. Special protection for such a sensor device can be provided by integrating it into the plastic bodies of lights in the rear part of the vehicle.

A proximity sensor with the invention-based range of function can also be inserted in the actuation buttons on the vehicle. For example, an actuation of a trunk lid can be triggered by manual pressure application, as well as by performing an operating scheme, which is detected by means of the proximity sensor.

In an especially advantageous embodiment of the invention, the proximity sensor is integrated in a vehicle or manufacturer badge on the vehicle. In particular, in the rear part the badges of the vehicle manufacturer are located on prominent places. There, it is possible to place proximity sensors in various designs. When instructed, the user can easily find and reach this place, which allows for safe and easy operation.

In a further development of the invention, the signal device is also integrated in the badge. For example, the badge is backlit by means of an LED, if required in combination with an optical conductor or diffuser. By means of such illumination, it is possible to provide the indication for actuating a removal from the proximity sensor (sequence of the period of time $t_s$), as well as the indication for an upcoming opening of the trunk lid (for example, by rapid flashing or change of color).

In the context of the invention, it is preferably possible to adjust the process-determining time periods $t_s$, $t_e$ with an operating device on the vehicle. For this purpose, it is possible to provide time frames in the vehicle. The user is then able to choose between extremely error-proof time frames with high requirements for the performance by the user and more tolerant time frames.

According to the invention, it can also be provided to monitor the signals with regard to additional actuation gestures alongside the detection of actuation according to the method described. The same function can be triggered by different gestures. The method described above does not place high requirements on the user because he is guided through the operation by means of the signaling process. However, an experienced user can prefer a gesture that can be rapidly performed. In particular, this operating scheme can be provided in the form of a swipe gesture as an alternative operating possibility. In this case, in a characteristic signal change parallel to the method described, it is tested whether within a predetermined time period the detected approach increases up to a value of maximum approach and then rapidly decreases. At the same time, attention is paid to a monotonous increase (or decrease, depending on the signal and sensor) and an opposite return to the initial value.

This means that in addition to the above-mentioned operating procedure a second, alternative operating procedure is monitored and the actuation is detected when the signal reply of the proximity sensor changes from its quiescent value within a first period of time $t_a$ by more than a threshold value $s_a$, the signal reply of the proximity sensor approaches again the quiescent value within the double period of time $2t_a$ and differs from this quiescent value by less than the threshold value $s_a$.

In a further embodiment, in a test of the second, alternative operating procedure, an actuation is only detected when the signal progression increases in monotonous manner during the period of time $2t_a$ for at least one third of this period of time and decreases in monotonous manner for at least one third of this period of time.

In this way, the user is allowed to use comfortable, easy to learn gestures, as well as efficient, more sophisticated gestures.

The operating concept can also include direct contact with or covering the sensor device for a predetermined time, wherein direct contact can be equated with a maximum approach.

BRIEF DESCRIPTION OF THE DRAWINGS

The invention is now described in more detail by means of the enclosed drawing.

DETAILED DESCRIPTION

Figure 1A:
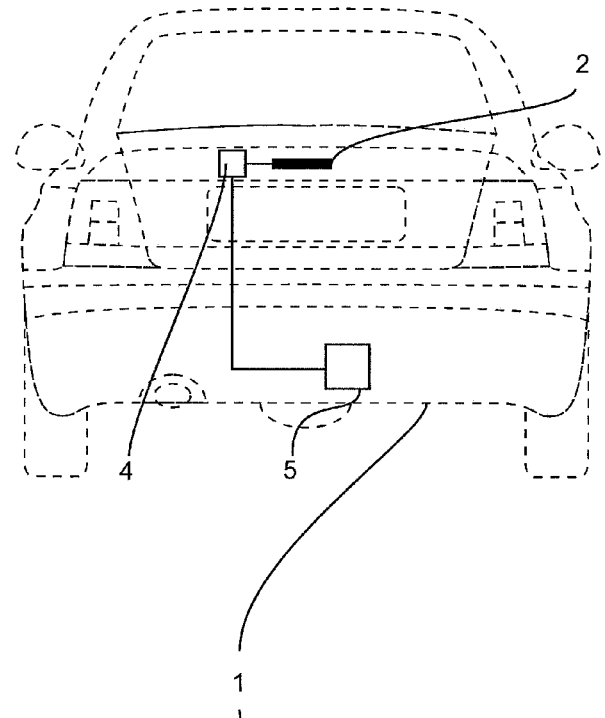
FIGS. 1a and 1b show a diagram of the arrangement for performing an embodiment of the invention.
Figure 1B:
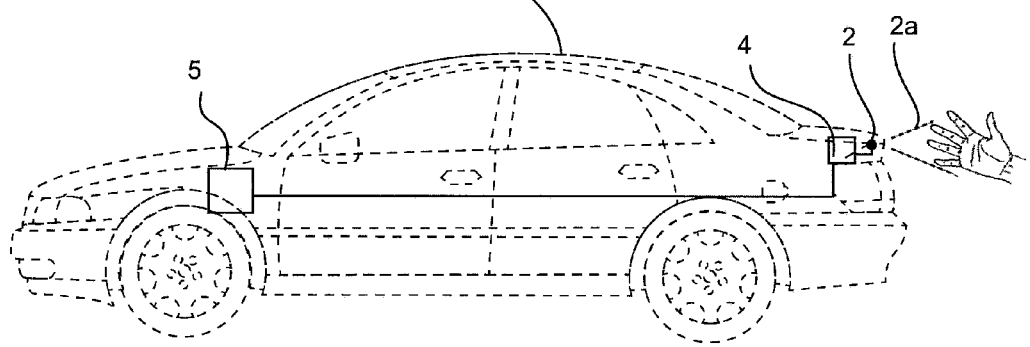

FIGS. 1a and 1b show a vehicle in which a proximity sensor 2 in the form of a sensor electrode is arranged in the rear part. This sensor electrode 2 is connected with a control unit 4 which controls the sensor electrode as a capacitive electrode and periodically determines its respective capacitance. This control unit 4, in turn, is coupled with a central control device 5 of the vehicle. The control unit 4 assumes the control of the electrodes 2 and the signal evaluation, i.e., the determination of the signal replies and allocation to an operating signal. A possibly generated operating signal is transmitted from the control unit 4 to the central control device 5 which can perform the closing function and electrical opening of the trunk kid.

The electrode 2 is arranged as a component of a sensor device in the upper rear part, integrated in a manufacturer badge at the trunk lid. The manufacturer badge is provided with a lighting device which is designed as a signaling device for guiding the user. The detection range 2a of the sensor device faces backward, as shown in FIG. 1b.

FIG. 1b shows the hand of a user. The hand can approach the proximity sensor 2 so that it is situated in the detection range of the sensor. For an actuation detection, the hand has to approach the sensor 2 in the range of several cm. When this occurs, the subsequently described signal evaluation takes place.

Figure 2:
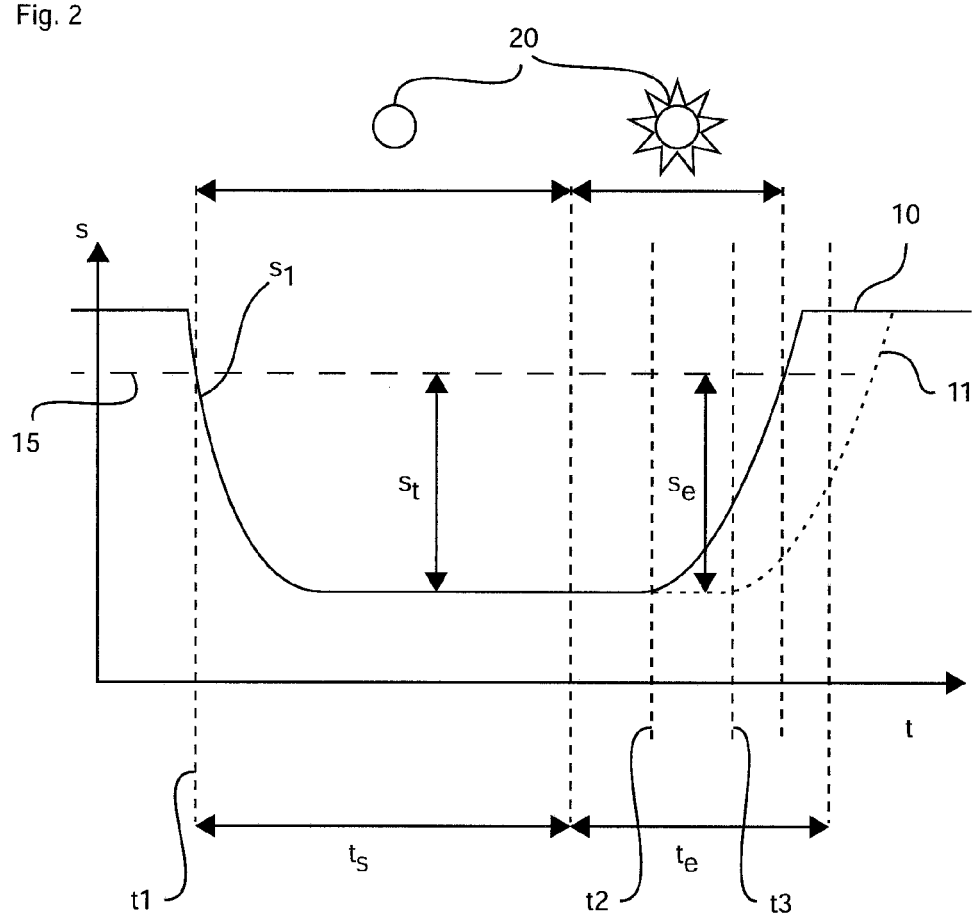
FIG. 2 shows a diagram of the monitored signal progression and the time frame of the invention-based method.

FIG. 2 shows the signal progression of the method.

Two signal progressions 10 and 11 are shown which, however, only differ in the rear temporal area. Signal progression 10 shows a successful actuation, progression 11 shown a non-successful (failed) actuation.

Initially, until a moment t1, a signal is received from the proximity sensor, which corresponds to an idle signal.

At the moment t1 the signal of the sensor differentiates a threshold value 15. The hand of the user approaches the sensor. This characteristic signal change $s_1$ triggers the further procedure. From this moment onward, for the period of time $t_s$, it is monitored whether the signal changes by more than a value $s_t$, in this example, whether it crosses again the threshold value 15. To perform a valid actuation, the user has to remain in front of the sensor for the period of time $t_s$ in a predetermined distance range. In this example, the user has to place his hand in a distance of between 1 cm and 10 cm in front of the sensor, without actually touching it.

Therefore, in this example, the value $s_t$ is the difference between maximum value in a minimally allowed approach and threshold value of the trigger. The period of time $t_s$ amounts to several seconds, for example, 2 seconds.

During this time period, the lighting device 20, which can backlight the manufacturer badge of the vehicle, is inactive. If, during the period of time $t_s$, it was determined that the approach was basically fixed, the lighting device 20 is activated after the period of time $t_s$ is completed.

In the case of the signal progression 10, the user reacts at the period of time t2, i.e., with a certain reaction period starting with the signaling process through the lighting device 20, and removes his hand. As a result, the signal changes by more than the signal value $s_e$ and the signal crosses the threshold value 15 and returns into idle mode.

Because of the fact that the threshold value 15 was crossed within the time frame $t_e$, both requirements, the fixed phase $t_s$ and the dynamic phase $t_e$ were sufficiently considered. An actuation is detected.

However, in the case of signal progression 11, the user reacts only at the moment t3, i.e., with a greater reaction period starting with the signaling process through the lighting device 20, and removes his hand at a later point in time. As a result, the signal crosses the threshold value 15 later, after the period of time $t_e$ is completed. Because of the fact that the threshold value was crossed outside of the time frame $t_e$ and therefore no signal change greater $s_e$ was determined within $t_e$, no actuation is detected.

Figure 3:
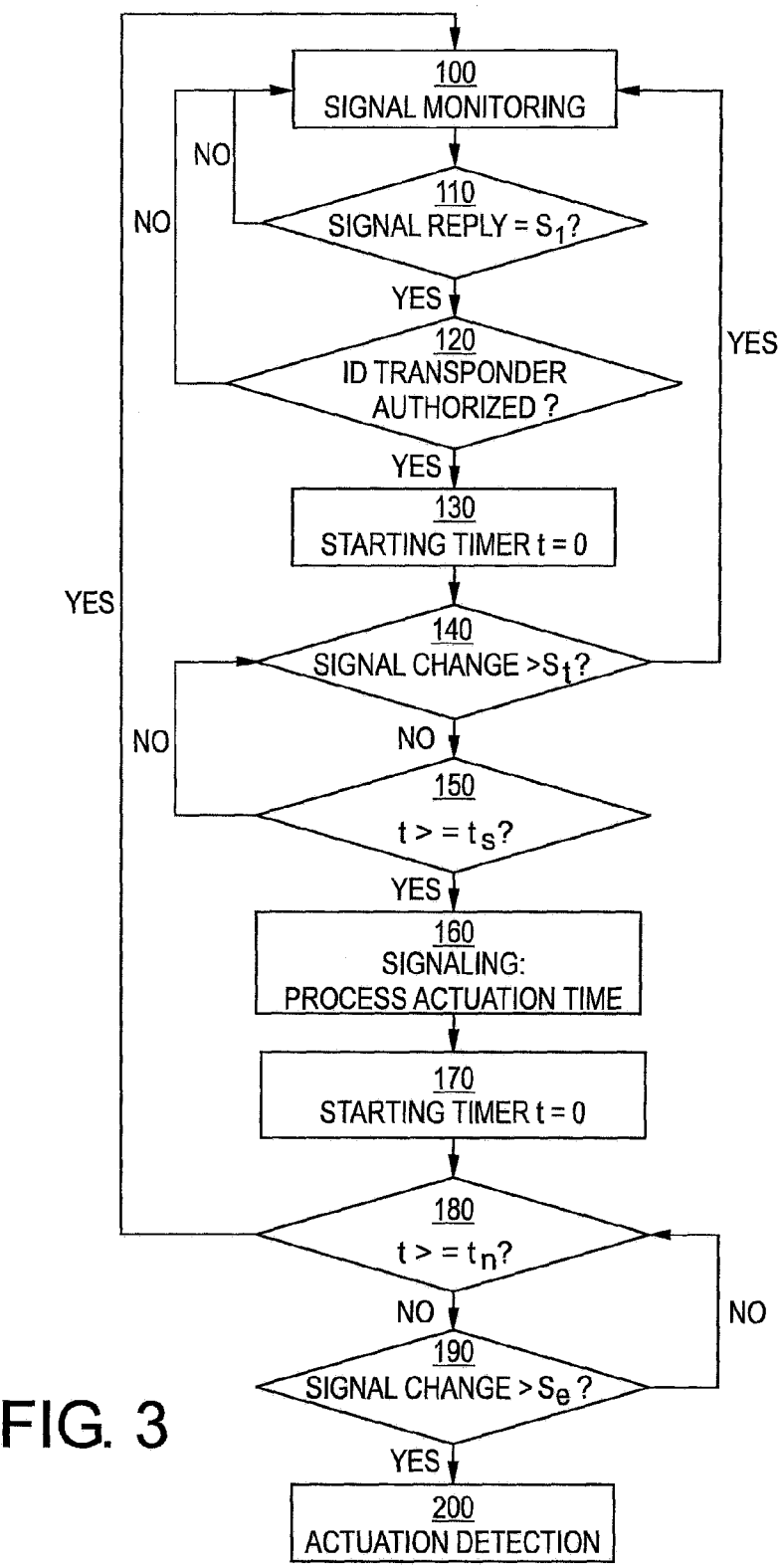
FIG. 3 shows a diagram of the monitored schedule and the time frame of the invention-based method.

FIG. 3 shows a process diagram of the method.

In this embodiment, the signal of the capacitive sensor (sensor 2 shown in FIGS. 1a and 1b) is used for triggering the method. In step 100, a periodic detection of the sensor data with 100 Hz takes place. If in this detection range an approach is detected, i.e., if in step 110 the sensor signal corresponds to a characteristic reply s1, the method is continued with step 120.

In step 120, the request of the ID transponder takes place, which the user has to carry along so as to be able to perform a keyless actuation. Usually the request is performed by transmitting an LF alert signal om the vehicle to the ID transponder, which replies to the vehicle with a communication process in the HF range. If authorization is not performed successfully, for example, because a person tries to perform the gesture without a valid ID transponder, the method is interrupted.

If the authorization was performed successfully, a timer is started in step 130. By means of this timer, the process of the fixed phase is monitored with the period $t_s$ (step 150). During the period of time $t_s$, the sensor signal periodically continues to be evaluated and tested whether the approach is maintained.

If the approach has been maintained in a fixed manner for the period of time $t_s$, i.e., the hand was not significantly removed, the signal device is switched on in step 160. In this example, the stop lights of the vehicle are actuated for this purpose. The user behind the vehicle detects in a convenient manner this signaling process.

Simultaneously with the signaling process, another timer is started in step 170, and in steps 180 and 190, it is tested whether the approach is cancelled within the period of time $t_e$, i.e., the hand is removed again.

When this does not occur, the method is cancelled in step 180 after the period of time has been completed. However, if the signal change $s_e$ is detected in step 190, the function is triggered in step 200.

The invention claimed is:

1. A method for detecting a function actuation on a motor vehicle with a sensor device, wherein the sensor device includes a proximity sensor for detecting the approach of a user, comprising the steps of:
monitoring the signals of the proximity sensor with regard to a signal change in the form of a characteristic first signal reply $s_1$, which indicates an approach to the proximity sensor,
monitoring the signals of the proximity sensor for a period of time $t_s$, wherein the method is interrupted when the signal reply of the proximity sensor changes by more than a predetermined value $s_t$ within the period of time $t_s$,
actuating a signal device after the period of time $t_s$ has expired in order to signal to the user that the actuation time has expired, monitoring the signals of the proximity sensor for a period of time $t_e$, wherein the method is continued when the signal of the proximity sensor changes by more than a predetermined value $s_e$ within the period of time $t_e$, and otherwise the method is interrupted, wherein when the method is continued, the actuation of the function on the motor vehicle is detected and the function trigger is signaled to a control device in the motor vehicle.

2. A method according to claim 1, wherein prior to a function trigger, a wireless request is transmitted to an ID transponder, which the user can carry along, asking to verify the authorization for accessing the requested function.

3. A method according to claim 2, wherein the request of the ID transponder is made prior to actuating the signal device and the method is continued only when a successful authorization has taken place.

4. A method according to claim 1, wherein a capacitive sensor is used as proximity sensor.

5. A method according to claim 1, wherein an optical signal device is used as the signal device.

6. A method according to claim 5, wherein the sensor device is integrated in a vehicle badge.

7. A method according to claim 6, wherein a badge light is used as signal device.

8. A method according to claim 5, wherein the sensor device is integrated in a door handle.

9. A method according to claim 1, wherein an audible signal device is used as the signal device.

10. A method according to claim 1, wherein the function to be triggered results in opening a trunk lid of a motor vehicle.

11. A method according to claim 1, wherein at least one of the periods of time $t_e$ and $t_s$ can be adjusted by means of a user input, preferably at a central control device of the vehicle.

12. A method according to claim 1, wherein parallel to the above-mentioned operating procedure a second, alternative operating procedure is monitored, wherein an actuation is detected, when the signal reply of the proximity sensor changes by more than a threshold value $s_a$ from its quiescent value within a first period of time $t_a$, and the signal reply of the proximity sensor approaches again the quiescent value within a double period of time $2t_a$ and differs from this quiescent value by less than the threshold value $s_a$.

13. A method according to claim 12, wherein in testing the second, alternative operating procedure an actuation is detected only when the signal progression increases in a monotonous manner during the period of time $2t_a$ for at least one third of this period of time and decreases in a monotonous manner for at least one third of this period of time.

14. A method according to claim 1, wherein the period of time $t_s$ amounts to less than four seconds.

15. A method according to claim 14, wherein the period of time $t_s$ amounts to less than three seconds.

16. A method according to claim 15 wherein the period of time $t_s$ amounts to less than two seconds.

* * * * *